(12) United States Patent
Jenko et al.

(10) Patent No.: US 8,007,272 B2
(45) Date of Patent: Aug. 30, 2011

(54) SHOOTING POT FOR FEEDING MULTIPLE NOZZLES

(75) Inventors: Edward Joseph Jenko, Essex, VT (US); Manon Danielle Belzile, Fairfield, VT (US)

(73) Assignee: Husky Injection Molding Systems Ltd. (CA)

( * ) Notice: Subject to any disclaimer, the term of this patent is extended or adjusted under 35 U.S.C. 154(b) by 0 days.

(21) Appl. No.: 12/504,689

(22) Filed: Jul. 17, 2009

(65) Prior Publication Data

US 2009/0274790 A1    Nov. 5, 2009

Related U.S. Application Data

(63) Continuation-in-part of application No. 11/931,106, filed on Oct. 31, 2007, now Pat. No. 7,771,190.

(51) Int. Cl.
*B29C 45/23* (2006.01)
(52) U.S. Cl. .................. 425/564; 425/566; 425/572
(58) Field of Classification Search .................. 425/564, 425/566, 572
See application file for complete search history.

(56) References Cited

U.S. PATENT DOCUMENTS

| 4,333,608 | A | 6/1982 | Hendry |
| 4,775,308 | A * | 10/1988 | Schad et al. .................. 425/572 |
| 4,966,545 | A | 10/1990 | Brown et al. |
| 5,069,840 | A | 12/1991 | Arnott |
| 5,112,212 | A | 5/1992 | Akselrud |
| 5,123,833 | A | 6/1992 | Parker |
| 5,536,164 | A | 7/1996 | Brun, Jr. et al. |
| 5,738,149 | A | 4/1998 | Brun, Jr. et al. |
| 6,347,934 | B1 | 2/2002 | Anderson et al. |
| 6,884,061 | B2 | 4/2005 | Okamura et al. |
| 7,771,190 | B2 * | 8/2010 | Jenko ............................ 425/564 |

* cited by examiner

*Primary Examiner* — Timothy Heitbrink

(57) ABSTRACT

A hot runner system including a shoot pot system for transferring melt from a single shooting pot to multiple nozzles. Melt is fed from a source of melt into the cavity through the multiple nozzles, and a valve isolates melt in the cavity from melt in the source. A plunger within the cavity is driven forward to inject melt in the cavity into a mold cavity at high pressure without significantly increasing the pressure of melt in the source. The plunger optionally functions as both the plunger and the valve by opening and closing communication between the cavity and the manifold as it is rotated.

7 Claims, 8 Drawing Sheets

SHOOTING POT FOR FEEDING MULTIPLE NOZZLES

CROSS-REFERENCE TO RELATED APPLICATIONS

This application is a continuation-in-part application of prior U.S. patent application Ser. No. 11/931,106, filed on Oct. 31, 2007.

STATEMENT REGARDING FEDERALLY SPONSORED RESEARCH

Not Applicable.

APPENDIX

Not Applicable.

BACKGROUND OF THE INVENTION

1. Field of the Invention

The present invention relates to injection molding systems and relates in particular to the injection of metered amounts of melt and to the injection of melt at high pressure.

2. Related Art

In many applications it is desirable to mold plastic parts with the least amount of plastic necessary to perform the desired function of the finished part without premature failure. Therefore, as resins are made increasingly stronger, part wall thickness can correspondingly be made thinner and more molded parts can be made with the same amount of melt. In addition, since thinner parts are quicker to cool, set and eject, parts with thinner walls can be made at a faster cycle time than parts with thicker walls, which increases maximum machinery output rates.

Thinner parts generally require higher injection pressures than thicker parts of similar size and shape. Therefore, machinery injection units capable of creating increasingly higher injection force are required to fill mold cavities for increasingly thin-walled parts. Prior designs attempting to meet this need have utilized high pressure injection units coupled with hot runner manifold systems capable of withstanding high pressures. These high pressure injection units and manifold systems are often more expensive and more difficult to maintain because higher quality materials capable of withstanding high pressures must be used. These systems also suffer from the fact that a significant amount of pressure is lost as the melt passes through the manifold and the nozzle, which makes achieving desired pressures within the mold cavity more challenging still.

In many applications it is also desirable to reliably produce molded parts with statistically consistent part characteristics. In many instances customers require stringent and repeatable molding processes to be verified with sensors, instrumentation and/or fixed and documented molding parameters. One area of particular concern is part weight, which is perceived as an indication of complete part filling and consistency of part quality and/or uniformity.

In many prior designs, this is accomplished by precision design and manufacturing of hydraulically balanced melt channel layouts, carefully thermally balanced heat distribution of the manifold and nozzles, use of valve gated cavity filling orifices in the manifold, and valve pin position sensors to confirm the opening and closing of each cavity position during the injection cycle.

SUMMARY OF THE INVENTION

The present invention provides an injection apparatus capable of injecting melt into a mold cavity at high pressure while utilizing a low pressure injection unit and manifold. The apparatus according to the present invention is also capable of precisely metering the amount of melt injected into a mold cavity during each injection cycle.

The apparatus according to the present invention has a cavity contained within and defined by a housing. This cavity receives melt at low pressure from a source of melt. The source of melt can include conventional equipment used for low pressure injection molding such as, for example, a low pressure injection unit and a low strength manifold. When the cavity is appropriately filled with melt, a selectively closable valve intermediate to the source of melt and the cavity closes, thereby isolating melt in the cavity from melt in the source. A plunger within the cavity is then driven forward increasing the pressure of the melt within the cavity and injecting melt in the mold cavity at high pressure. The valve prevents any substantial backflow of melt into the source of melt during the injection and also prevents any substantial increase in the pressure of melt within the source. As backflow into the source of melt is prevented and the cavity is proximate to the injection outlet of the nozzle, the amount of melt injected into the mold cavity can be precisely metered by monitoring the distance the plunger is pressed forward.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
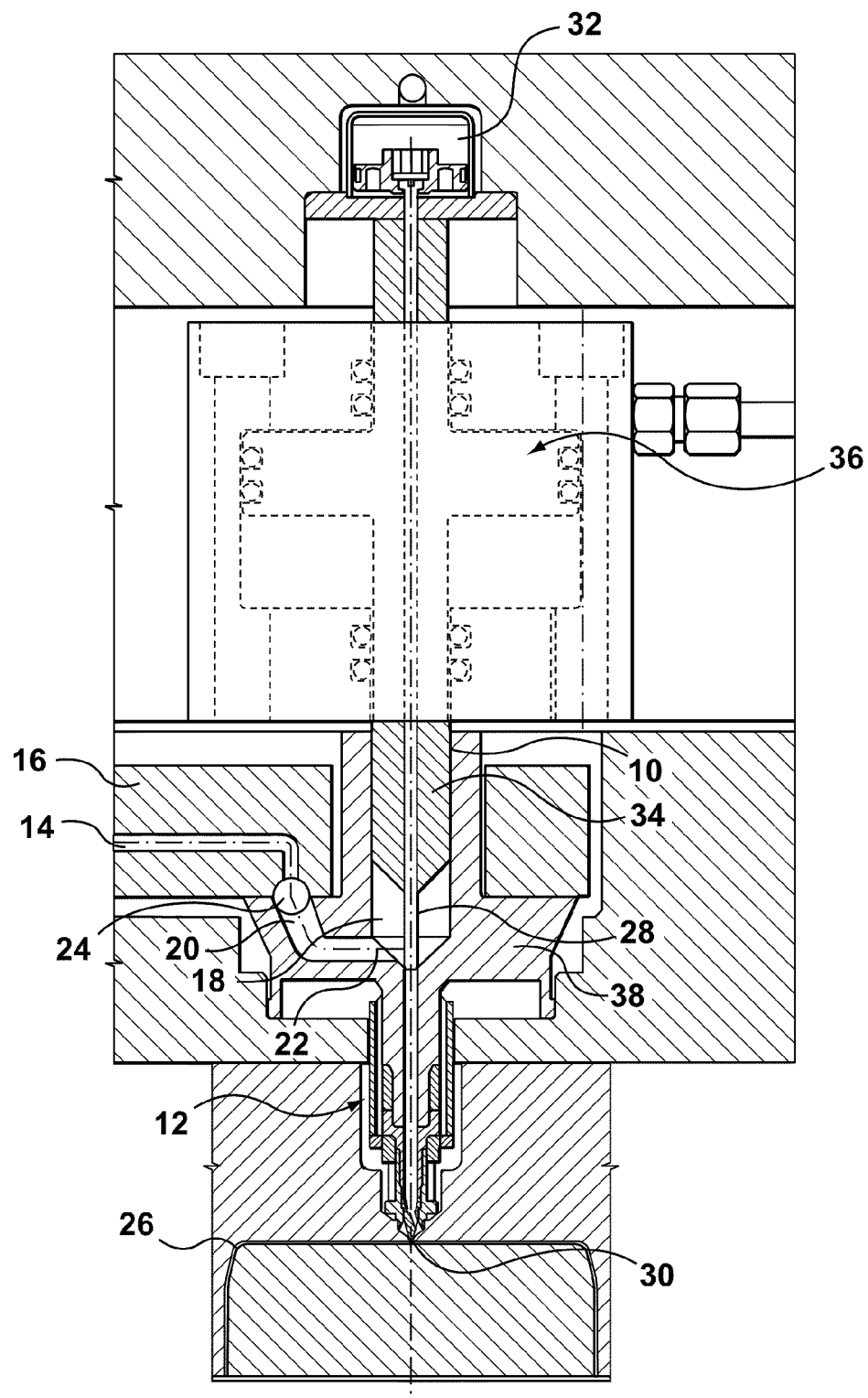
FIG. 1 is a sectional view of an injection molding apparatus constructed in accordance with an embodiment of the present invention.

As illustrated in FIG. 1, a hot runner system for injection molding is provided having a shooting pot assembly 10 contained within a nozzle 12. According to this embodiment, melt is injected at low pressure into a manifold channel 14 of a manifold 16. Manifold channel 14 is provided with melt by way of a hot runner system leading from a source or supply means, such as an extruder. Melt passes from manifold channel 14 into a bushing cavity 18. In some embodiments, melt passes through a bushing channel 20 prior to entering bushing cavity 18. Melt passes into bushing cavity 18 at an inlet 22. A valve 24 separates manifold channel 14 from bushing channel 20. Valve 24 opens to fill bushing cavity 18 with melt and closes during or prior to injection of melt into a mold cavity 26 to isolate melt in bushing cavity 18 from melt in manifold channel 14.

According to the embodiment depicted in FIG. 1, a valve stem 28 is provided within bushing cavity 18 to open and close an injection outlet 30 defined by the bushing 38. Valve stem 28 is driven to open and close injection outlet 30 by a suitable valve stem actuator 32, such as, by way of example, a pneumatic drive or electric motor.

A plunger 34 is also provided in bushing cavity 18. Preferably, plunger 34 is dimensioned so as to form a seal between an outer surface of plunger 34 and side walls defining the bushing cavity 18. Plunger 34 is driven by a plunger actuator 36 capable of providing sufficient force to create a desired pressure within bushing cavity 18, such as, by way of example, a hydraulic drive or electric motor. In the depicted embodiment, valve stem 28 passes through the center of plunger 34 and is actuated independently from plunger 34.

At the time of injection of melt into mold cavity 26, valve 24 is closed and valve stem 28 is pulled away from injection outlet 30 to allow melt in bushing cavity 18 to pass through injection outlet 30. With injection outlet 30 open, plunger 34 is actuated to move forward to inject melt into mold cavity 26 at high pressure. The closed valve 24 facilitates a high pressure differential between melt in bushing cavity 18 and melt in manifold channel 14 during injection of melt into mold cavity 26. Thus, higher pressure is achieved within the bushing 38 while lower pressure is maintained within manifold channel 14 and structures upstream of manifold 16.

Figure 6:
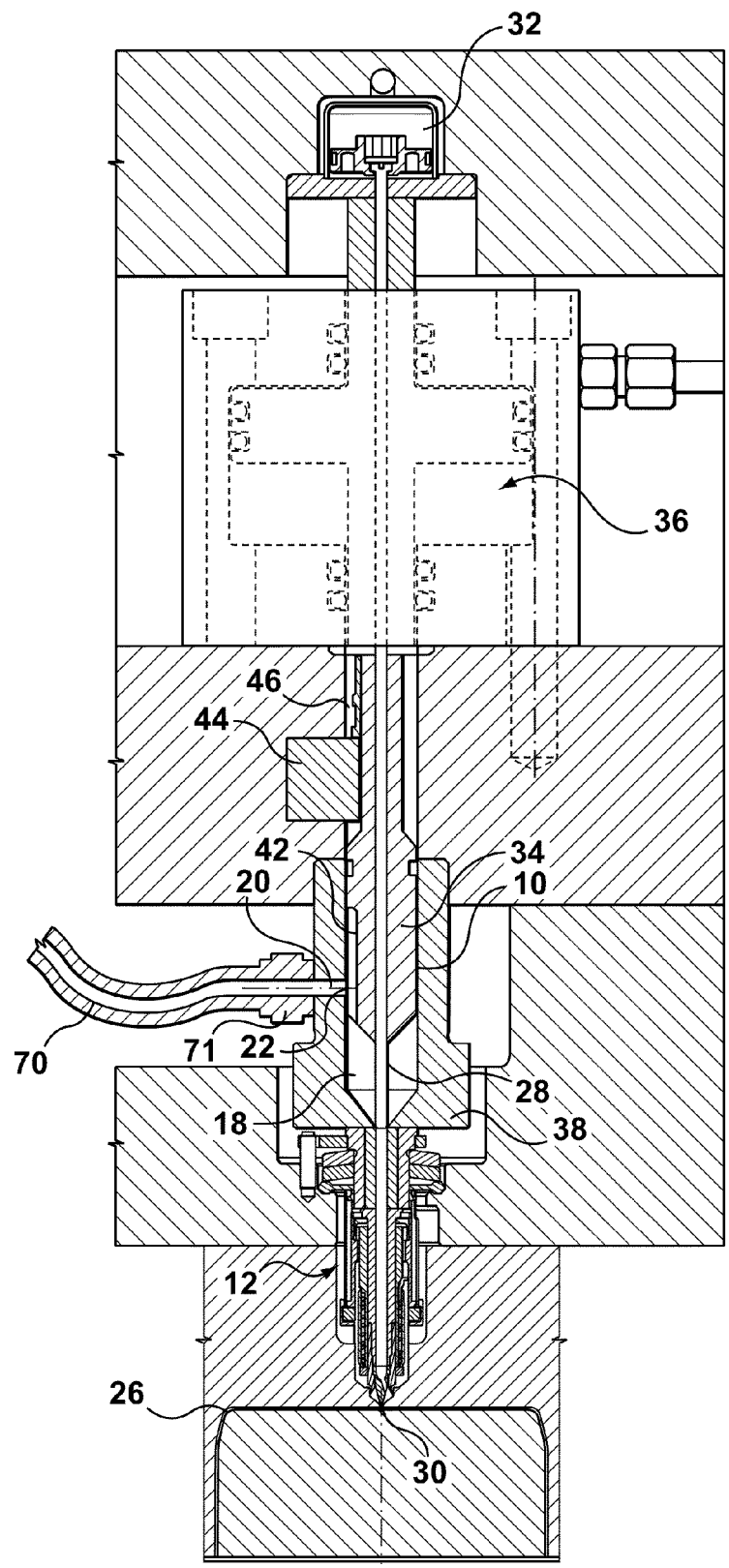
FIG. 6 is a sectional view of an injection molding apparatus having an alternative valve mechanism and constructed in accordance with an embodiment of the present invention.

As high pressure is isolated to nozzle 12, a low performance injection unit that handles and discharges melt at low pressure can be used in conjunction with the present invention to produce pieces requiring injection of melt at high pressure, such as parts having thin walls. Additionally, a low strength manifold 16, such as one made with low grade steel or through free form fabrication, can be used in the production of such molded pieces requiring high pressure injection. According to an embodiment of the present invention shown in FIG. 6, a heated manifold 16 having a flexible melt distribution system is employed.

Furthermore, in applications in which precise control over the quantity of melt injected into each mold cavity 26 is desirable, the present invention can be employed to ensure a metered amount of melt is positively and repeatedly injected into each individual mold cavity 26. In a hot runner system employing multiple nozzles 12, this feature facilitates precise balance between each nozzle 12. Synchronized filling and consistent part weight can be adjusted and controlled through plunger 34 start and stop positions. These start and stop positions can be confirmed with sensors for greater precision and reliability.

Figure 2:
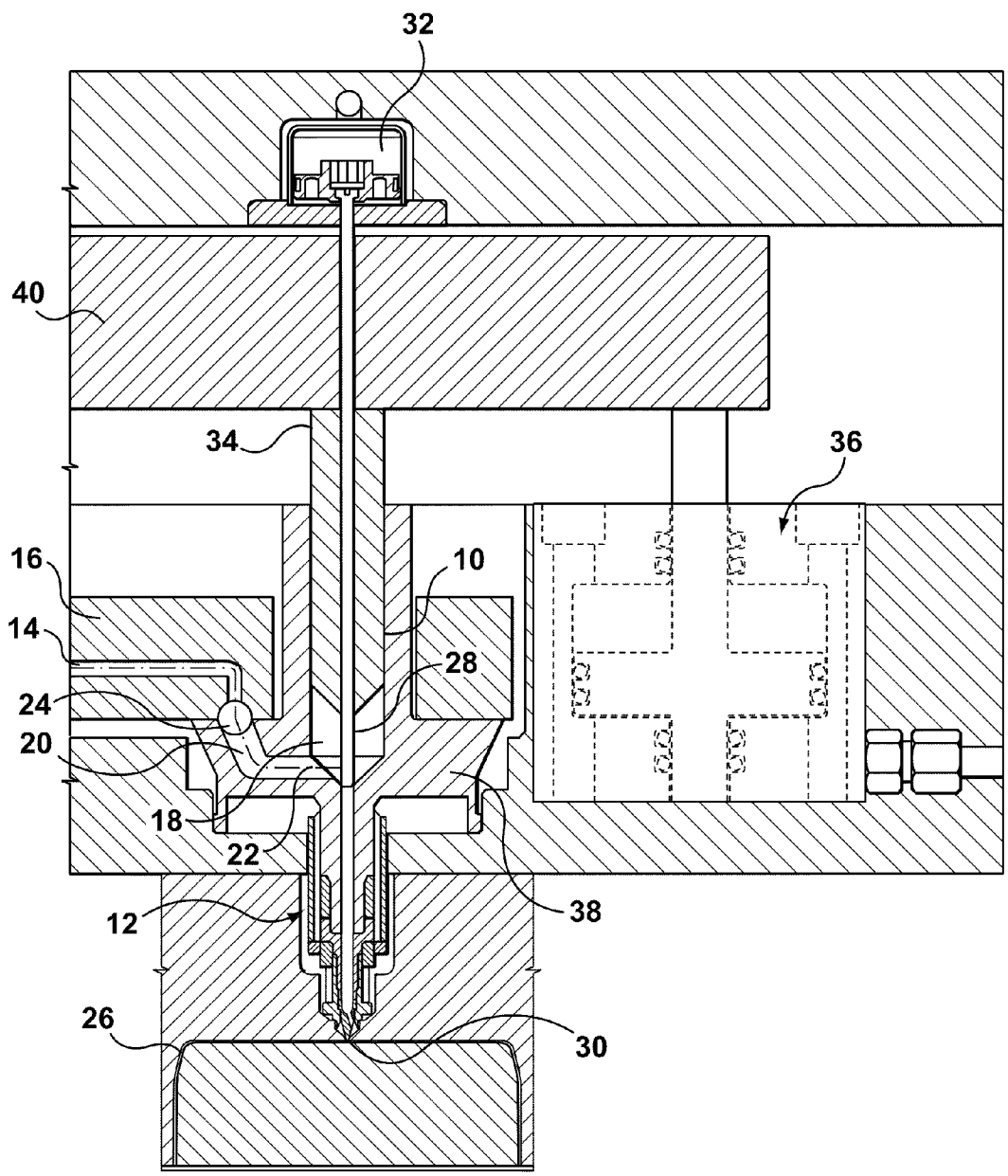
FIG. 2 is a sectional view an injection molding apparatus having a reduced vertical profile and constructed in accordance with an embodiment of the present invention.

Another embodiment of the present invention is depicted in FIG. 2. This embodiment is similar to the embodiment depicted in FIG. 1, except the height of the system is reduced by situating plunger actuator 36 side-by-side with nozzle 12 rather than on top of nozzle 12. According to this embodiment, plunger 34 and plunger actuator 36 are attached to a plate 40 that transmits power from plunger actuator 36 to plunger 34.

Figure 3:
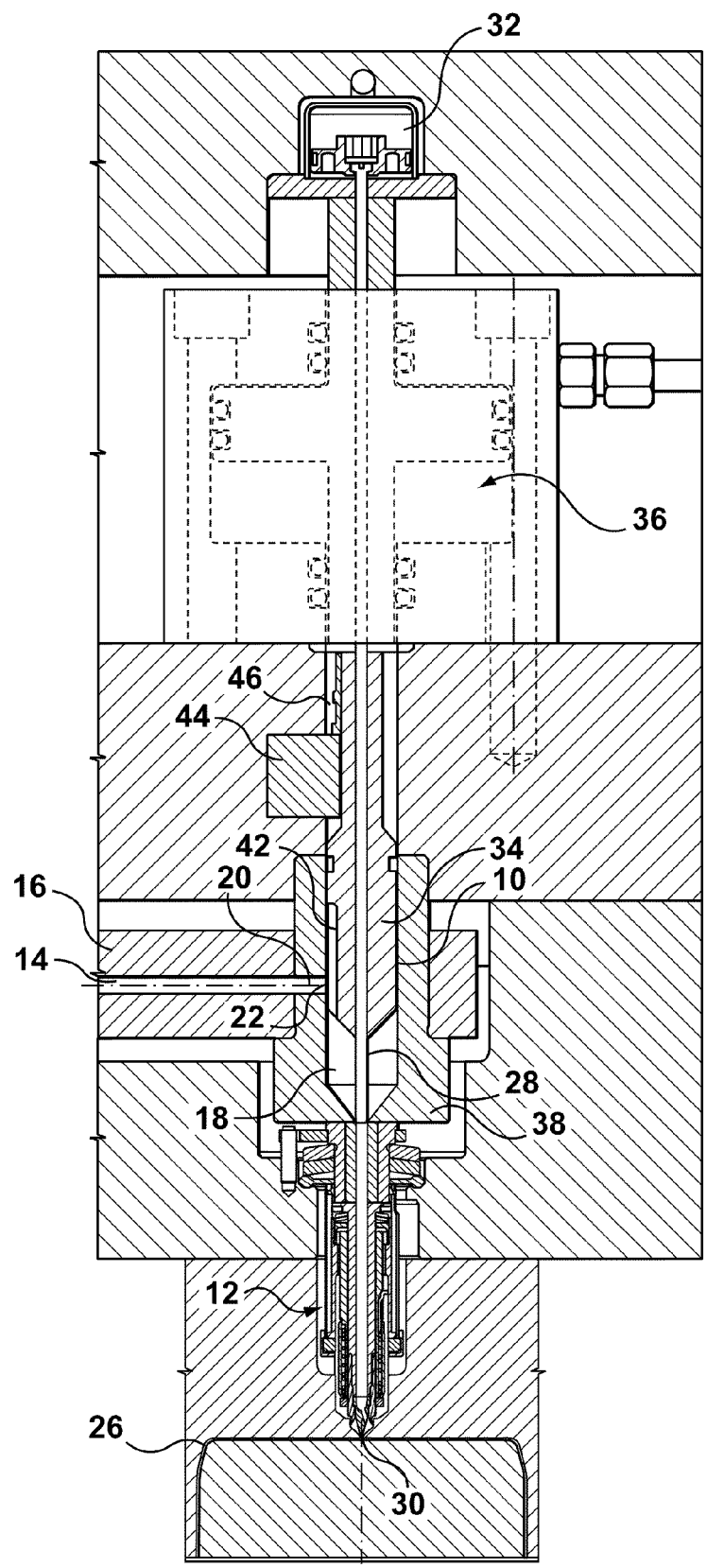
FIG. 3 is a sectional view of an injection molding apparatus having an alternative valve mechanism and constructed in accordance with an embodiment of the present invention.

In an embodiment depicted in FIG. 3, plunger 35 serves as both valve 24 and plunger 34 shown in FIG. 2 respectively, to isolate melt in bushing cavity 18 from melt in manifold channel 14. According to this embodiment, melt at low pressure passes from manifold channel 14 to bushing channel 20 without passing through a valve 24 as shown previously in FIGS. 1 and 2. A portion of one side of plunger 35 has a recess 42 that forms a channel between bushing 38 and plunger 34. When filling bushing cavity 18 with melt, plunger 35 is rotated to align recess 42 with inlet 22 and pulled back. Thus, while filling bushing cavity 18, melt flows from manifold channel 14, into bushing channel 20, then through inlet 22 into the channel formed by recess 42 between plunger 34 and bushing 38, thereby filling bushing cavity 18.

Prior to pressing plunger 35 forward to inject melt into mold cavity 26, plunger 35 is rotated such that recess 42 is not aligned with inlet 22, substantially preventing melt in bushing cavity 18 from flowing back into bushing channel 20 and manifold channel 14. After it is rotated, plunger 35 is actuated to move forward to inject melt into mold cavity 26 at high pressure through nozzle 12. In this manner the interaction between plunger 35 and bushing 38 serves as valve 24 to prevent pressurization of melt in manifold channel 14 and structures upstream therefrom during injection of melt into mold cavity 26.

In the depicted embodiment means for rotation of plunger is provided in the form of a rack or gear 44. Rack 44 is preferably motivated by an actuator (not shown) such as, for example, a hydraulic piston or electric motor, and interacts with teeth 46 formed on plunger 35 to cause plunger 35 to rotate as rack 44 is actuated to move up and down. Various other known means could be employed to rotate plunger 35 such as, by way of example, an arm and link system as disclosed in U.S. Pat. No. 5,112,212, the entire specification of which is incorporated herein by reference.

Figure 4:
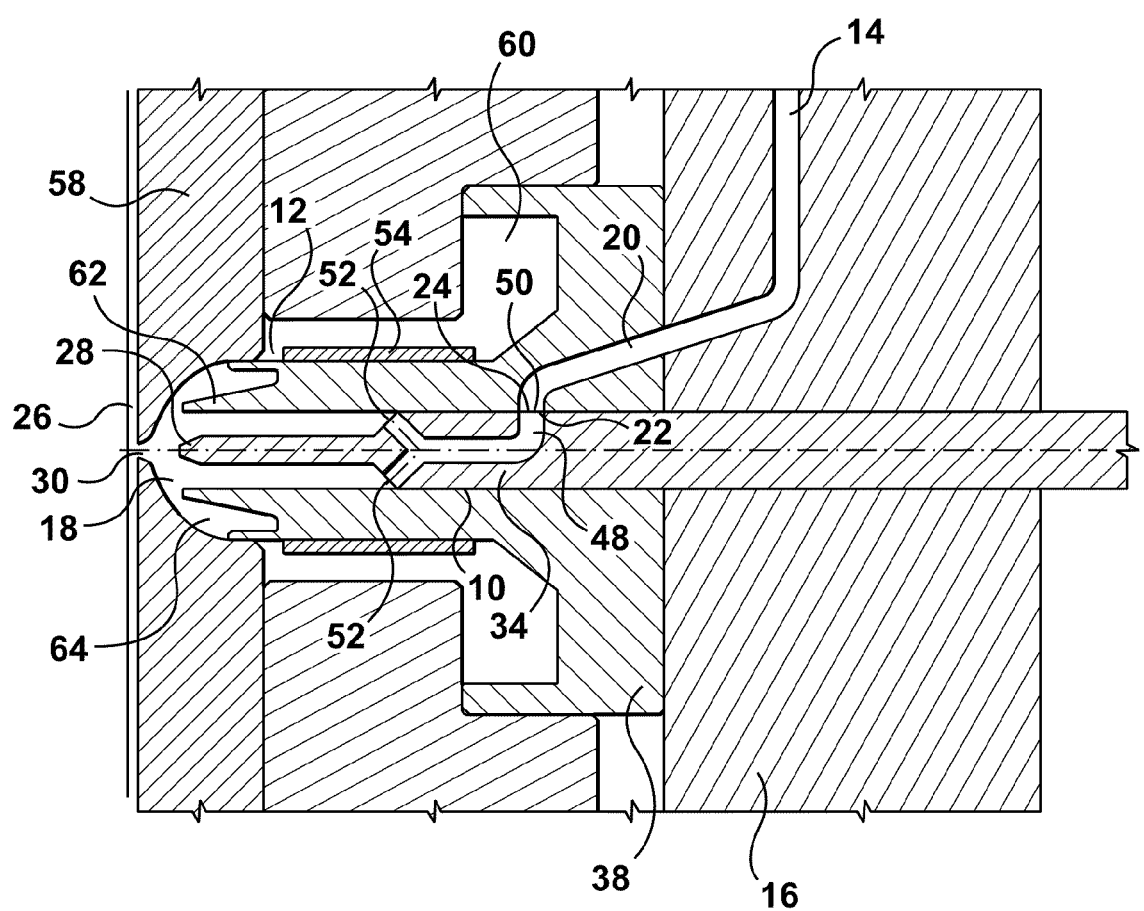
FIG. 4 is a sectional view of an injection molding apparatus having an alternative valve and valve stem construction and constructed in accordance with an embodiment of the present invention.

In the embodiment depicted in FIG. 4, valve stem 28, having a smaller cross-sectional area, is fixed to the end of plunger 35, having a larger cross-sectional area, and valve stem 28 and plunger 35 move together as a single unit. According to this embodiment, plunger 35 contains a plunger channel 48 passing substantially through the center of plunger 35. Plunger channel 48 has ingress 50 at an opening located on the surface of plunger 35, and egress 52 that opens into bushing cavity 18. In the depicted embodiment, egress 52 is two openings at the junction of plunger 35 and valve stem 28; however, the placement and number of such openings is a design choice, and more or less openings could be used for egress 52.

According to this embodiment, when filling bushing cavity 18 with melt, melt flows from manifold channel 14 to bushing channel 20 without passing through valve 24. Valve stem 28/plunger 35 combination is pulled back and rotated to align ingress 50 with inlet 22 such that melt passes from manifold channel 14, then through bushing channel 20 into plunger channel 48 and then empties into bushing cavity 18.

When injecting melt into mold cavity 26, valve stem 28/plunger 35 combination is rotated such that ingress 50 is not aligned with inlet 22 so as to prevent backwash into, and pressurization of, manifold channel 14. Valve stem 28/plunger 35 combination is pressed forward such that melt in bushing cavity 18 is injected into mold cavity 26 at high pressure. When valve stem 28/plunger 35 combination reaches its most advanced position, valve stem 28 will close injection outlet 30. Preferably, after an appropriate cooling period and with injection outlet 30 closed, the injection molded piece is expelled from mold cavity 26 and the cycle begins again.

As depicted in FIG. 4, immediately surrounding nozzle housing is a heater 54 that heats bushing 38 to maintain melt within bushing cavity 18 at a desired temperature. It is preferable to heat melt while limiting the amount of heat transferred to manifold plate 56 and mold 58. Accordingly, air space 60 is provided as an insulator between much of bushing 38 and manifold plate 56. Flanges 62 are also provided within bushing cavity 18 to increase contact area between the hot bushing 38 and melt, while decreasing the area in which the hot bushing 38 is in direct contact with mold 58. The pockets 64 formed between flanges 62 and mold 58 may be filled with a thermoset material, or simply allowed to fill with melt.

Figure 5:
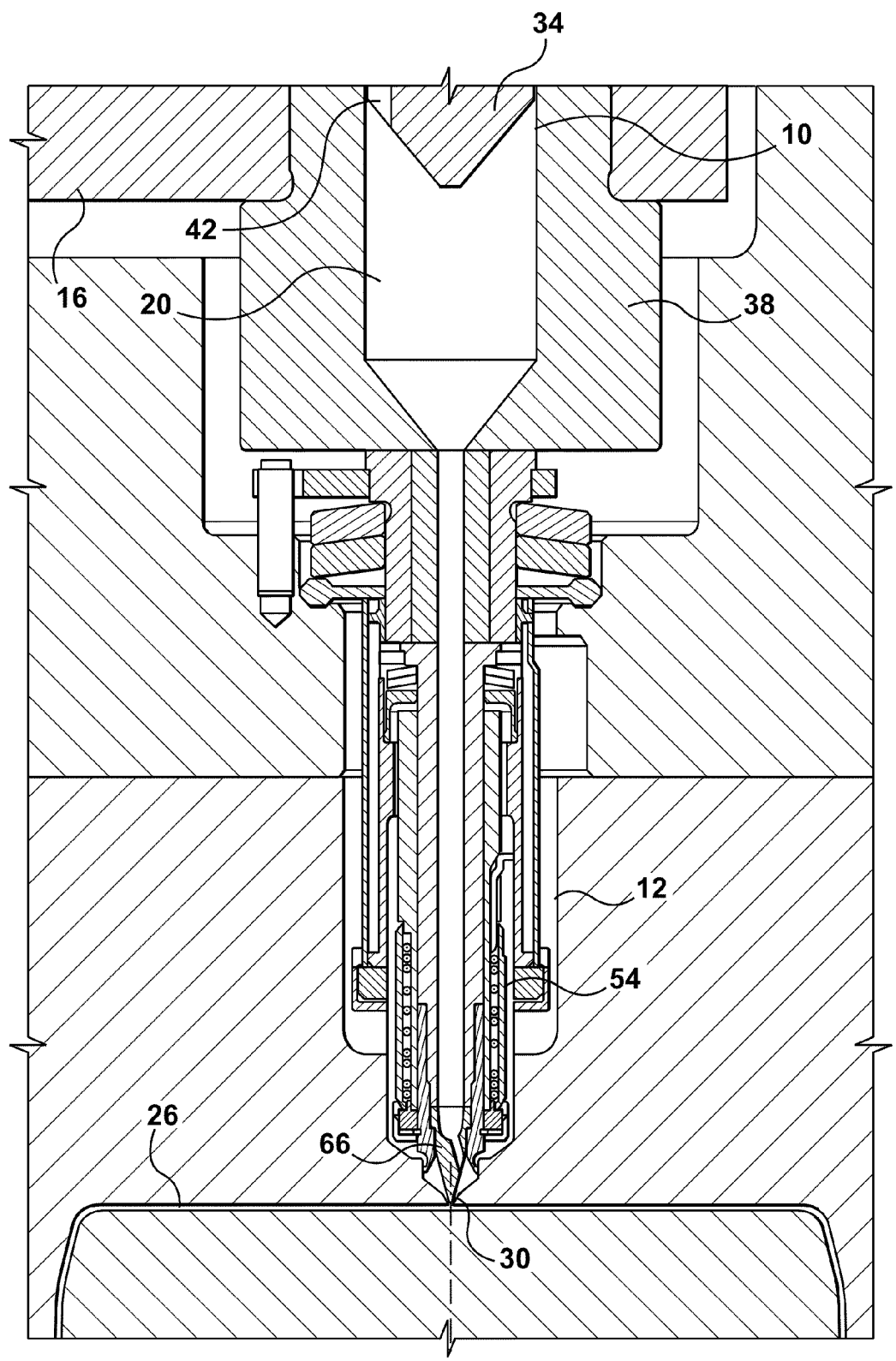
FIG. 5 is a close-up sectional view of a thermal shut-off injection molding apparatus constructed in accordance with an embodiment of the present invention.

In an alternate embodiment depicted in FIG. 5 thermal shut-off is employed as a means of preventing melt from drooling out of injection outlet 30 after the part is ejected from mold cavity 26 and prior to a new injection of melt into mold cavity 26. This embodiment can be employed with plunger 37 configurations similar to those depicted in FIGS. 1-4; however, no valve stem 28 is required to close injection outlet 30. According to this embodiment, heater 54 is provided surrounding nozzle 12 near injection outlet 30. Heater 54 maintains melt in the nozzle at an appropriate pre-injection temperature. Prior to reaching injection outlet 30, melt passes through a tip insert 66.

Similar to the prior embodiments, melt is injected into bushing channel 20 at low pressure and isolated from manifold channel 14 by rotating plunger 37 which is then pressed forward to inject melt into mold cavity 26 at high pressure. At the end of an injection cycle, when mold cavity 26 is appropriately filled with melt, melt within injection outlet 30 is cooled and solidifies. This solidified melt serves as a plug to prevent molten melt from passing through injection outlet 30 while the injection molded piece is expelled from mold cavity 26. On the next cycle, when melt is injected into mold cavity 26, pressure in bushing channel 20 pushes the solidified melt through injection outlet 30 into mold cavity 26 where it melts and mixes with the fresh stream of molten melt.

Figure 7:
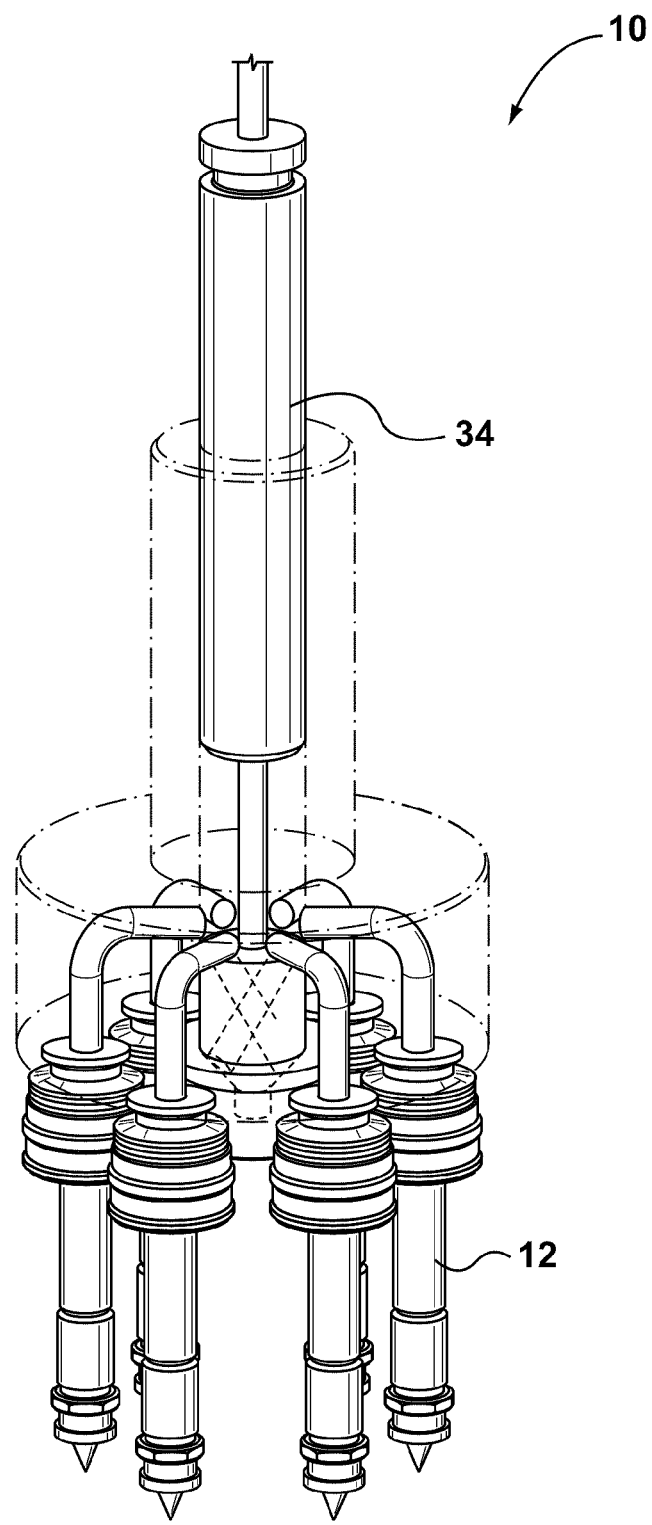
FIG. 7 is a perspective view of a shooting pot assembly used to supply molten material to a plurality of nozzles.
Figure 8:
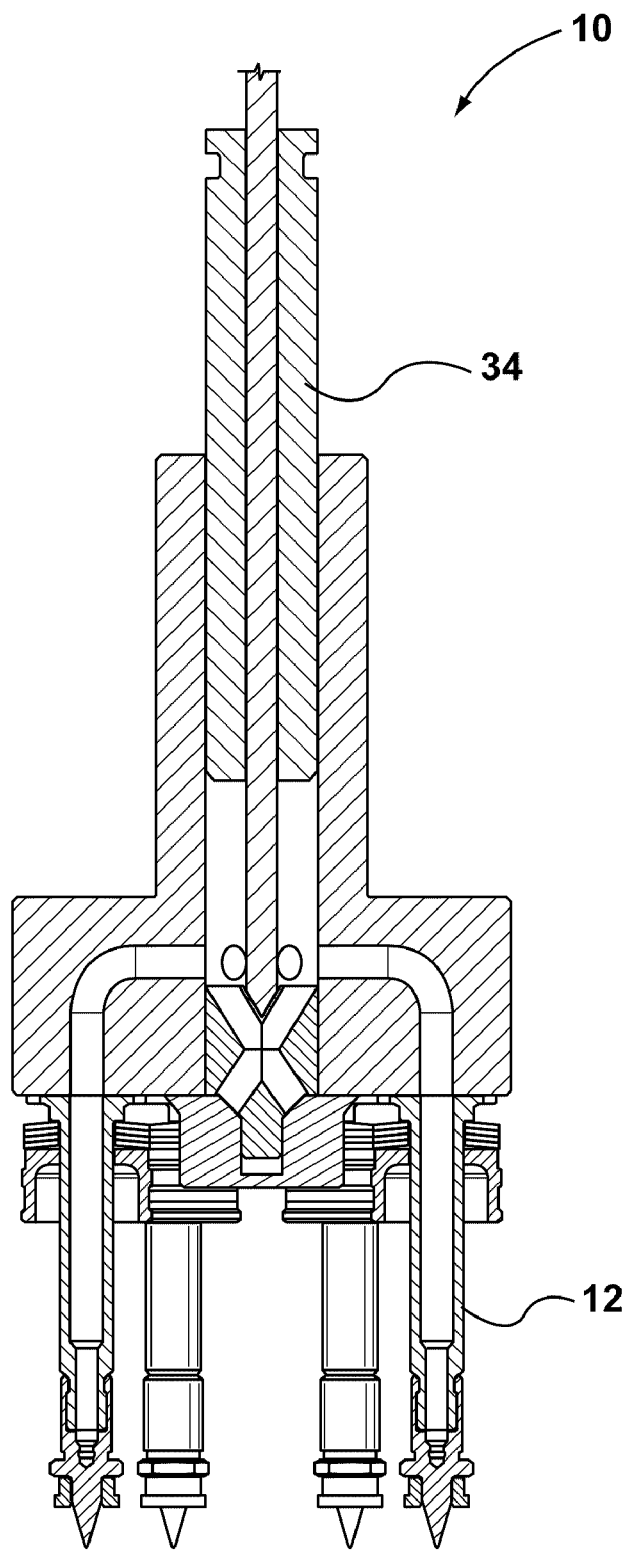
FIG. 8 is a cross-sectional view of the shooting pot assembly used to supply molten material to a plurality of nozzles.

Turning now to FIGS. 7 & 8, the embodiments of the shooting pot assembly 10 previously described may be modified such that the plunger 34 feeds two or more nozzles 12. In the embodiment shown in FIGS. 7 & 8, the plunger 34 is actuated to move forward to inject melt through two or more nozzles 12 and then into the mold cavity 26 at high pressure.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An injection apparatus, comprising:
   a housing defining a cavity therein, said cavity in fluid communication with a source of melt and a plurality of nozzles, said housing further defining an injection outlet at a first end thereof;
   a plunger in sliding communication with said cavity, said plunger operable for movement toward said injection outlet; and
   a selectively closable valve, wherein said valve substantially isolates said cavity from said source,
   wherein said cavity comprises at least one wall surface, said plunger being operable for sliding movement relative to said wall surface, and wherein said valve is arranged at said wall surface, and
   wherein said valve is selectively opened and closed by movement of said plunger relative to said wall surface of said cavity.

2. The injection apparatus according to claim 1, wherein:
   a first portion of said plunger adjacent said wall surface of said cavity defines a recess therein relative to a remaining portion of said plunger, said recess being in fluid communication with said cavity and said injection outlet, and
   further comprising:
      a first position of said plunger wherein said recess is in fluid communication with said source, whereby said valve is open;
      a second position of said plunger wherein said recess is substantially isolated from said source, whereby said valve is closed; and
      wherein said plunger is selectively moveable between said first and second position.

3. The injection apparatus according to claim 1, wherein:
   said plunger defines a plunger channel passing therethrough, said plunger channel having an inlet and an outlet, said outlet being in fluid communication with said cavity, and
   further comprising:
      a first position of said plunger wherein said plunger channel inlet is in fluid communication with said source, whereby said valve is open;
      a second position of said plunger wherein said plunger channel inlet is substantially isolated from said source, whereby said valve is closed; and
      wherein said plunger is selectively moveable between said first and second position.

4. The injection apparatus according to claim 1, further comprising:
   a valve stem, wherein said valve stem is fixed to said plunger, and wherein said valve stem is operable for engagement with said injection outlet.

5. An injection apparatus, comprising:
   a housing defining a cavity therein, said cavity in fluid communication with a source of melt and a plurality of nozzles, said housing further defining an injection outlet at a first end thereof;
   a plunger in sliding communication with said cavity, said plunger operable for movement toward said injection outlet; and
   a selectively closable valve, wherein said valve substantially isolates said cavity from said source; and
   a valve stem, said valve stem operable for engagement with said injection outlet, and
   wherein said valve stem is actuated independently from said plunger.

6. The injection nozzle assembly according to claim 1, further comprising:
   a channel in fluid communication with said source and said cavity, wherein said channel is contained within said housing.

7. The injection apparatus according to claim 6, wherein: said valve is intermediate to said source and said channel.

* * * * *